Patented May 28, 1929.

1,714,506

UNITED STATES PATENT OFFICE.

RUSSELL P. HEUER, OF PHILADELPHIA, PENNSYLVANIA, ASSIGNOR TO GENERAL REFRACTORIES COMPANY, A CORPORATION OF PENNSYLVANIA.

BRICK AND CEMENT FOR FURNACE USE.

No Drawing.    Application filed December 29, 1924. Serial No. 758,722.

My invention relates to the use of chrome ore as a refractory.

An object of my invention is to provide a plastic bonding material for use with chrome ore, and which when mixed with chrome ore produces a refractory mass that is self bonding at furnace temperatures and substantially as highly refractory as the chrome ore alone.

A further object is to bond chrome ore at furnace temperatures with clay and magnesia, avoiding by the presence of magnesia that considerable loss in refractory character of chrome ore which attends the addition of clay alone.

A further object is to combine a bonding material that is effective at ordinary temperatures but ineffective at furnace temperatures with a bonding material that does not become effective at ordinary temperatures but does become effective at furnace temperatures.

A further object is to mix chrome ore with bonding material effective at low temperatures though relatively ineffective at high temperatures and other bonding material that becomes effective at high temperatures though relatively ineffective at low temperatures, and to use the mixture either in the form of a refractory cement for setting refractory brickwork or as refractory bricks that may be pressed and dried at ordinary temperatures.

A further object is to mix chrome ore with magnesia and clay, to moisten the mixture with a magnesium salt solution (preferably that of magnesium chlorid or magnesium sulfate), to press the moistened mass into bricks, to dry the bricks under atmospheric conditions or in heated ovens, and to use the bricks thus made as a high grade refractory for lining furnaces, and the like.

Further purposes will appear in the specification and in the claims.

Attempts have previously been made to bond chrome ore with clay alone, but at high temperatures the clay and chrome ore react together and cause a substantial lowering of the melting point of chrome ore. Furthermore, at temperatures far below the melting point, this reactivity manifests itself in an undesirable softening of the clay bond.

I have found that with additions of magnesia, preferably finely ground and desirably but not necessarily in quantities equal to the clay, this basic refractory agent will prevent or greatly reduce direct reaction between the clay and chrome ore. The magnesia also prevents or greatly reduces the softening of the bond.

It would appear that the action is due to the greater basicity of the magnesia as compared to the chrome but other causes may enter into this. At any rate the addition ties together the clay-chrome ore mixture into a bonded refractory mass which resists softening even at very high temperatures.

Magnesia itself does not lower the melting point of chrome ore and hence an excess of magnesia above the amount required to prevent the clay from fluxing with the chrome is substantially immaterial.

I have found further that it is desirable and for unfired bricks quite important, in mixtures of chrome ore, clay and magnesia to increase the low-temperature bond by adding a substance which will even temporarily serve this purpose and which will not injuriously impair the action at high temperatures.

However, the low temperature bond need have no beneficial effect at high temperatures. A soluble salt of magnesium fulfils all of these conditions.

Preferably this added salt of magnesium is $MgCl_2$ or $MgSO_4$, which is regarded as one of the chemical equivalents of the $MgCl_2$, and when preparing the mixture for use the other ingredients are moistened with a solution of the magnesium salt. These magnesium salts unite with magnesia to form a low temperature cement.

It is to be noted that the magnesium oxide already existing in the chrome ore—usually if not always present—cannot develop cements with the added $MgCl_2$ or $MgSO_4$ because it is already in chemical combination.

Considerable latitude is afforded in adjusting the composition of refractory materials on the above principles. The amount of clay added is a governing factor. A small amount of clay is required to give the requisite bonding. An increasing amount of clay increases the plasticity but requires an increasing addition of magnesia to prevent the reaction between clay and chrome. In most cases the quantity of clay should not exceed 15%, by weight, as the refractory mass will be subject to excessive shrinkage if the quantity of clay be increased unduly.

The magnesia addition should preferably equal or exceed somewhat the clay present.

Maximum magnesia limits are not readily definable, as an excess is not harmful.

In making bricks, where part of the bonding action would be effected by the high pressures available and permissible and where shrinkage should be kept low, a relatively low percentage of clay is desirable and I have secured good results with as small a quantity of clay as 4%. On the other hand where refractory bricks of any composition are to be cemented and the spaces between closed by my refractory material, troweled in, great plasticity is needed and, on account of the thinness of the layer, greater shrinkage in the material troweled in can be tolerated. Here a much larger percentage of clay is desirable and I have successfully used as high as 15%.

Where the material is to be tamped in, as by pneumatic tools, the conditions are usually somewhat between the two extremes indicated. The high local pressure available under the tool is limited by the opportunity of the material to flow, varying in differing locations. The material can be rammed but it must stay rammed to get the benefit of the pressure.

With these guiding principles those skilled in the art will have no difficulty by simple tests in determining the best proportions for the particular need, going below or above the limits named where special conditions permit.

The quantity of magnesia required has been found to be affected considerably by the fineness of division of the magnesia, the same quantity of magnesia being much more fully effective when it is quite finely divided.

The magnesium salt need not be added as such. For instance sodium chloride, if added, will act with the free magnesia and in the equilibrium obtained there will be some magnesium chloride formed. The addition of the sodium chloride is not objectionable because when the material is heated the sodium chloride will volatilize.

Magnesium sulphate though not as good a bonding material as the chloride is free from evolution of hydrochloric acid which takes place during initial heating when the chloride is used.

To illustrate the composition of an artificial refractory material on the above principles, the following mixture is cited:—

|  | Per cent. |
|---|---|
| Chrome ore | 83 |
| Magnesia | 9 |
| Clay | 6 |
| Magnesium chlorid | 2 |

This material melts at 1950° C. which is only about 40° C. below the melting point of pure chromium oxid. It dries in air to a hard mass and its bond does not soften even at high furnace temperatures.

One application of my refractory mixture of wide utility lies in making brick for high temperature uses. The chrome ore-clay-magnesia mixture is moistened with magnesium salt solution and the moistened mass is then shaped in moulds under pressure depending somewhat upon the intended use, for some uses extending to many thousand pounds to the square inch.

These moulded bricks may be dried under atmospheric conditions or in heated ovens. The drying develops a brick whose compressive strength can be made to exceed 5000 lbs. per square inch. These bricks are ready for use without further firing for the construction of furnace linings.

The heat of the initial firing decomposes the magnesium salt cements but at the same time hardens and strengthens the bond due to the presence of clay and magnesia.

The clay in the presence of free magnesia binds the refractory into a mass whose strength develops more and more as the heating continues.

The mixture of plastic substances with the chrome ore produces a pressed brick of denser structure than is obtained under similar pressures with chrome ore alone. This denser structure greatly reduces shrinkage in these bricks upon firing, adds strength at high temperatures and prevents penetration of furnace slags into the brick.

I may apply such a refractory mixture also to fabrication of furnace linings by ramming the moistened material into place in the furnace with pneumatic or other tamping tools.

Such a lining dries to a hard mass which, upon firing the furnace for its initial use, develops the clay-magnesia bonding as described with brick linings. This procedure is advantageous for forming monolithic linings. The material thus made has extremely small shrinkage and does not crack at high temperatures.

I further apply such refractory material as a mortar for laying refractory bricks in furnace linings.

This mortar is plastic and can be readily troweled to form good joints in the brick work. It dries hard and increases its bond during the initial firing of the furnace.

This mortar is especially useful with fireclay brick. It adheres firmly to the brick and maintains its strength at high temperatures, protecting the brick from wear at the joined surfaces.

The application as a mortar can be extended into covering the exposed surface of the refractory brick, especially fireclay brick, with a thin layer. A hard surface layer develops which is well adapted to protect and to prolong the life of the lining.

In referring to chrome ore herein it has not been the intention to restrict to pure chromite ($Cr_2O_3$-$FeO$) but to include the commercial ore in which $Cr_2O_3$ is partially replaced by $Al_2O_3$ and $FeO$ is partially replaced by $MgO$ and in which there are siliceous impurities.

In view of my invention and disclosure, variations and changes will doubtless become evident to others skilled in the art, and I therefore claim all such in so far as they fall within the reasonable spirit and scope of my invention.

Having thus described my invention, what I claim as new and desire to secure by Letters Patent is:—

1. The process of making a chrome refractory brick from clay and chrome ore containing combined magnesia which consists in adding to a body of chrome ore a small quantity of clay and magnesia in sufficient quantity to prevent softening reaction between the clay and the chrome ore at high temperatures, and a solution of a salt which will yield magnesium ions in the mixture.

2. The process of making a chrome refractory from clay and chrome ore containing combined magnesia which consists in adding to a body of chrome ore, a small quantity of clay, and magnesia in sufficient quantity to prevent softening reaction between the clay and the chrome ore at high temperatures, a solution of a salt which will yield magnesium ions in the mixture and in forming the refractory from the moistened mass.

3. The process of making chrome refractory bricks from clay and chrome ore containing combined magnesia which consists in adding to a body of chrome ore, a small quantity of clay and magnesia in sufficient quantity to prevent softening reaction between the clay and the chrome ore at high temperatures, a solution of a salt which will yield magnesium ions in the mixture, in forming the refractory from the moistened mass and in pressing and drying the bricks to harden them without firing.

4. A mixture comprising chiefly chrome ore to which has been added a small quantity of clay, magnesia and a salt of magnesium adapted to react with magnesia and water to form a hard mass on drying.

5. A refractory composition consisting chiefly of chrome ore to which is added as small an amount of clay substance as is required for the desired plasticity and bonding properties and an amount of free magnesia sufficient to prevent the fluxing reaction between the chrome ore and clay.

6. A refractory composition which consists chiefly of chrome ore, a small quantity of clay and magnesia to which is added a soluble magnesium salt to obtain a refractory material which sets to a hard mass upon drying.

7. A refractory composition containing chiefly chrome ore, magnesia, clay and a bonding material serving with magnesia to produce low temperature bond, having clay and low temperature bonding material approximating but 10% of the total content.

8. A refractory composition containing chiefly chrome ore, magnesia, clay and a low temperature bond, having approximately 10% magnesia and approximately 10% of clay and low temperature bond.

RUSSELL P. HEUER.